(12) United States Patent
Cassells

(10) Patent No.: US 6,199,507 B1
(45) Date of Patent: Mar. 13, 2001

(54) MILKING MACHINES AND USE THEREOF

(75) Inventor: David Edward Lindsay Cassells, Auckland (NZ)

(73) Assignee: DEC International NZ Limited, Hamilton (NZ)

( * ) Notice: Subject to any disclaimer, the term of this patent is extended or adjusted under 35 U.S.C. 154(b) by 0 days.

(21) Appl. No.: 09/217,553

(22) Filed: Dec. 21, 1998

(30) Foreign Application Priority Data

Dec. 19, 1997 (NZ) ........................................................ 329452
Jun. 5, 1998 (NZ) ........................................................ 330599

(51) Int. Cl.[7] ........................................................ A01J 5/00
(52) U.S. Cl. ........................................ 119/14.02; 119/14.08
(58) Field of Search ............................ 119/14.02, 14.08, 119/14.14, 14.15, 14.37, 14.44

(56) References Cited

U.S. PATENT DOCUMENTS

| | | | | |
|---|---|---|---|---|
| 4,175,514 | * | 11/1979 | Souza et al. | 119/14.08 |
| 4,222,346 | * | 9/1980 | Reisgies | 119/14.08 |
| 5,275,124 | * | 1/1994 | Van Der Lely et al. | 119/14.08 |
| 5,651,329 | * | 7/1997 | Van Den Berg et al. | 119/14.02 |
| 5,762,020 | * | 6/1998 | Van Der Lely | 119/14.08 |
| 5,860,388 | * | 1/1999 | Tan et al. | 119/14.44 |

FOREIGN PATENT DOCUMENTS

| | | |
|---|---|---|
| 0626129 | 2/1999 | (EP) . |
| 224545 | 9/1989 | (NZ) . |

* cited by examiner

*Primary Examiner*—Peter M. Poon
*Assistant Examiner*—Elizabeth Shaw
(74) *Attorney, Agent, or Firm*—Jacobson, Price, Holman & Stern, PLLC

(57) ABSTRACT

A milking machine of a kind having a milk line to a milk receiver through which a vacuum is drawn, the machine being operable in (i) a milking mode and in (ii) a cleaning mode, wherein there is provided a cleaning line for cleaning fluid into the milk line, and wherein, when the machine is in its cleaning mode, cleaning fluid pooling and/or pooled in the cleaning line is caused to move (wholly or in part) under the action of a gas (e.g. ambient air) impulse into the pooling and/or pooled cleaning fluid from the cleaning line into the milk line and preferably the milk receiver. In moving from the cleaning line into the milk line which is of greater cross-section the fluid under the action of a transition zone flaring from the smaller conduit into the larger conduit, and a transition zone flushing flow flaring means flares to the surface of the milk line.

50 Claims, 2 Drawing Sheets

Figure 1:
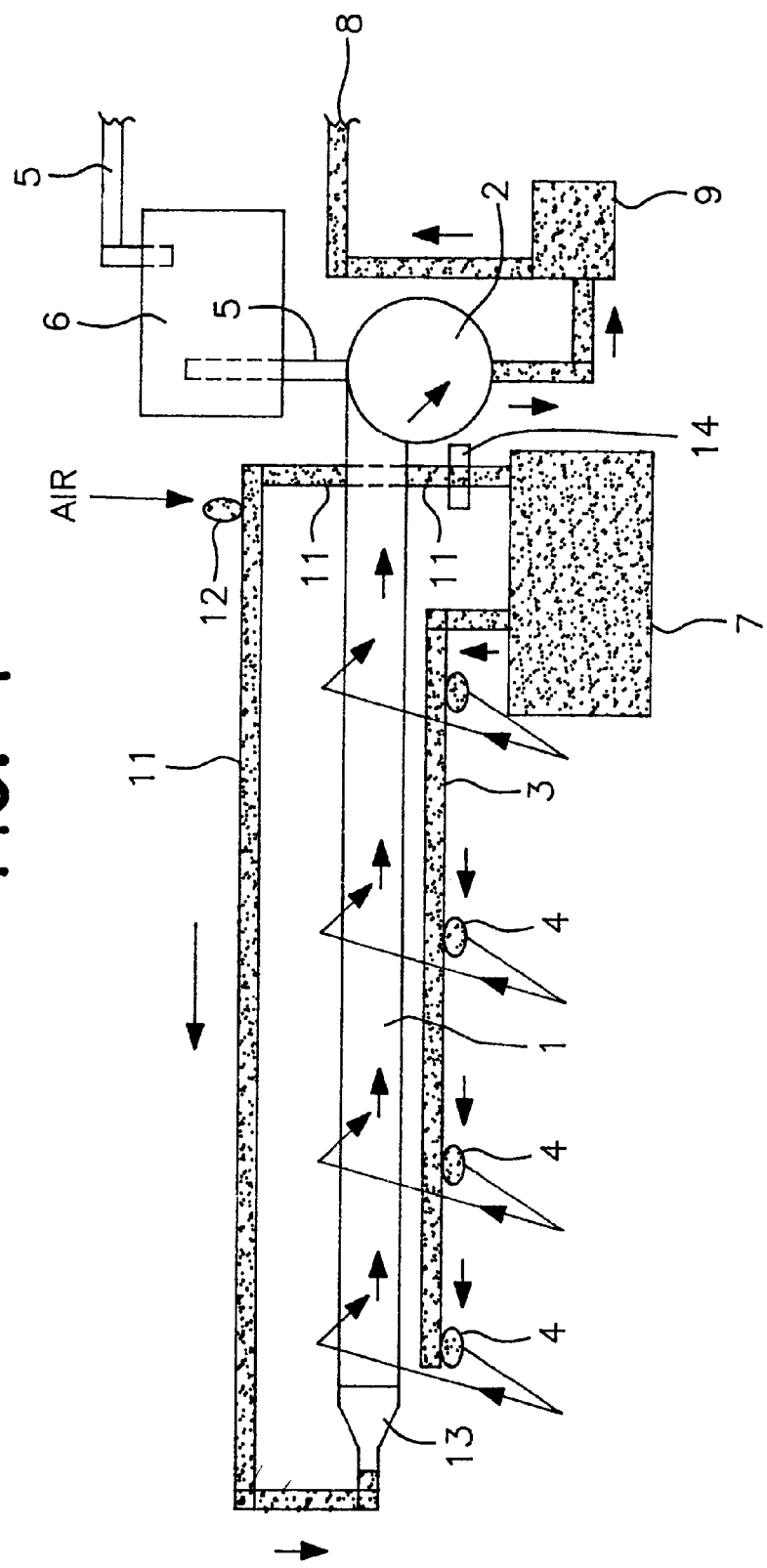

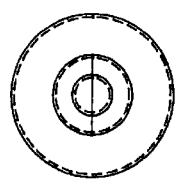
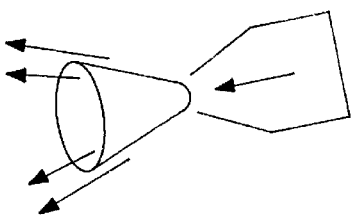
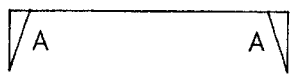
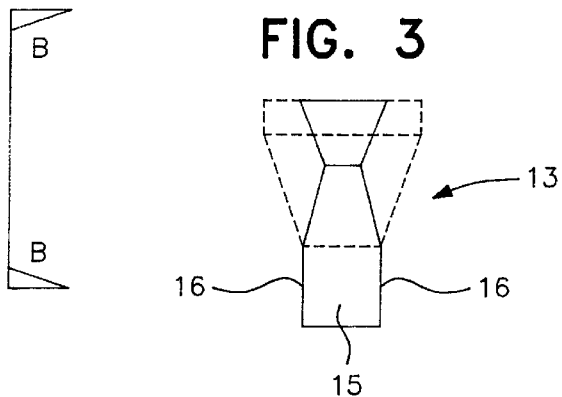
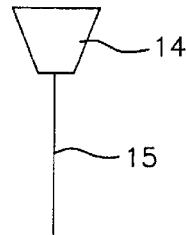
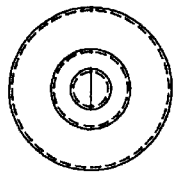
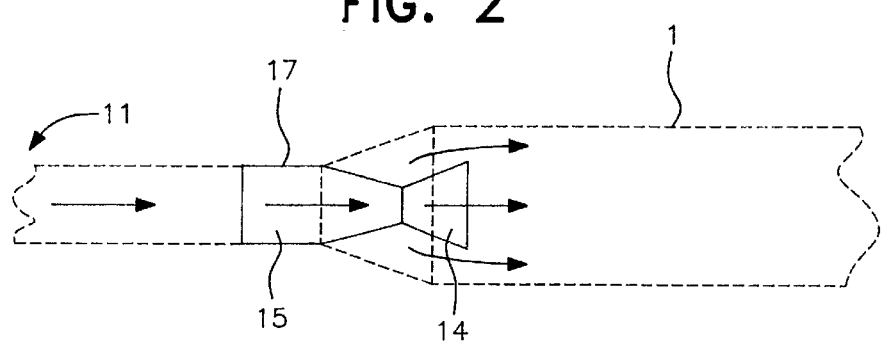

MILKING MACHINES AND USE THEREOF

The present invention relates to milking machines.

Most modern milking machines operate in two modes
(i) a milking mode;
(ii) a cleaning or washing mode.

Frequently in moving from one mode to another in order to achieve effective washing reconfiguration of the lines is sometimes required. This may involve the use of multi pathway valving systems.

Examples of such multi-modal milking machines include several currently on the market in New Zealand [for example, THE WAIKATO™ SUPAMILKER™ milking machines of this company, the milking machines of Alfa Laval (NZ) Limited (marketed by Nu Pulse New Zealand), that offered under the trade mark MILKERWARE™ and that available from L Read and Sons of Christchurch].

Typical of such systems is that disclosed in Alfa Laval (NZ) Limited New Zealand Patent Specification No. 224545 and Maasland NV in European Patent Application EP0626129A1.

The present invention relates to a system embodied in milking machinery and thus the resultant milking machinery and the methods of operation thereof as well as sub assemblies which will provide an alternative to existing choices.

In a first aspect the present invention consists in a milking machine of a kind having a milk line to a milk receiver through which a "vacuum" (as herein defined) is drawn, said machine being operable in (i) a milking mode and in (ii) a cleaning mode, wherein there is provided a "line" (as herein defined) ("the cleaning line") for cleaning fluid into said milk line, and wherein, when the machine is in its cleaning mode, cleaning fluid pooling and/or pooled in said cleaning line is caused to move (wholly or in part) under the action of a gas (e.g. air) impulse into the pooling and/or pooled cleaning fluid from said cleaning line into said milk line (and preferably (at least) said milk receiver).

Preferably the impulse is one of a series of impulses into different quantities of pooling and/or pooled cleaning fluid.

Preferably said impulses are periodic or otherwise spaced in time (e.g. whether under the action of a sensor control or a time based control).

Preferably said impulse into the pooling and/or pooled cleaning fluid is caused by an induction of ambient air at ambient pressure under the actions of said vacuum in the milk line.

In other forms of the present invention however, irrespective of whether or not the gas is solely or in part air, the pressure of the impulse gas can be greater than that of ambient air if desired. Where however the "vacuum" is that customary used for milking purposes (or thereabouts) there is a sufficient pressure differential between ambient air and the "vacuum" to achieve a movement of "slugs" of cleaning fluid through the system in a manner sufficiently turbulent to achieve effective cleaning.

Preferably said milking machine has a jetter line having jetters or other means to which the milking cups of a milk claw can be attached when configured to the cleaning mode so as to utilise the vacuum in the milk line to draw a cleaning fluid in from the jetter line.

Preferably said cleaning line is adapted to draw cleaning liquid from a similar or the same source as said jetter line only during the cleaning mode.

Preferably said cleaning line has at least a rising region from the region from which the gas impulse is to be injected, inducted or otherwise ingress so as to achieve sufficient pooling and/or flooding to ensure a sufficient quantity of the cleaning liquid is positioned between the incoming gas and the milk line.

Preferably flow choking, restricting or other means (for example a restrictor plate) is positioned between the region where the impulse gas is injected, inducted or otherwise ingresses and the source of the cleaning liquid for the cleaning line (preferably valved) such that even in the absence of any gas injection, induction and/or ingress there is in the cleaning mode a flow of cleaning liquid into the cleaning line and preferably from thence into said milk line and said receiver.

Preferably said milk line has a fall from where it is to receive cleaning fluid from said cleaning line through to said milk receiver.

Preferably said milk line is a loop line such as of a kind used by this company.

Preferably a sanitary trap is provided above said milk receiver.

Preferably the impulse flow of the cleaning fluid during the cleaning mode is such as to cause turbulent flows at different times along the milk line and ideally in the milk receiver and preferably also a cleaning flow over surfaces of said sanitary trap.

Preferably said milk receiver is connected to a milk pump and said sanitary trap is connected to a source of vacuum.

Preferably cleaning liquid can be discharged from the system upsteam or downstream from said milk pump depending on the particular installation.

Preferably cleaning liquid accumulating in the sanitary trap can be drained therefrom as and when required, i.e. so as not to interrupt significantly the cleaning mode requirement for vacuum in the system.

Preferably said milk line is of a large diameter kind (ie: preferably larger than the diameter of said cleaning line.

Preferably an expansion zone is provided between said cleaning line and said milk line.

Preferably said expansion zone involves a frustoconical or other type surface which has the effect of blasting all surfaces of the milk line with the cleaning fluid of said slug.

Preferably the machine improves the deployment of the flushing liquid from a conduit of smaller cross-section (preferably circular) into a conduit of larger cross-section (preferably circular) by providing a transition zone flaring from the smaller conduit into the larger conduit, and providing at and/or proximate to (but preferably at and partly downstream of) the transition zone flushing flow flaring means.

Preferably said flaring means is substantially conical or frustoconical.

Preferably said transition zone is an expansion "cone" [e.g. a frustoconical zone].

Preferably said flaring means is supported from an upstream appendage preferably having little flow interference (eg: a blade or thin plate affixed to opposed walls of the smaller conduit and/or the expansion "cone").

Preferably said gas injection, induction or ingress means is a valve having associated therewith appropriate control systems which are preferably timer or sensor based.

In a further aspect the present invention consists in assemblies or sub-assemblies of apparatus in accordance with the present invention.

In yet a further aspect the present invention consists in a method of operating a milking machine in its cleaning or washing mode which comprises the operative use of a milking machine as previously defined in such a cleaning or washing mode.

Preferably said use is before or after operation of the apparatus in its milking mode.

In still another aspect the invention consists in apparatus for operative association with components of a milking machine so as to provide a milking machine according to the present invention, said apparatus comprising or including means defining a conduit having an intake end for liquid and an outlet end connectable directly or indirectly into the milk line of a milking machine, means to allow the intake of air into said conduit between said ends, and means to provide a partial flow restriction for liquid between said intake end and the intake means.

Preferably said apparatus is mountable so as to pool intake liquid into contact with part of said intake means.

Preferably said outlet end is itself or is from an expansion cone (or the equivalent).

Preferably said outlet end has a cross-section several times that of the cross-section of said conduit and many times the cross-section of the flow restriction means (eg; the outlet about twice the diameter of the tubular diameter of the conduit is circular in cross-section).

Preferably said outlet end provides for an improvement of the flushing liquid from a conduit of smaller cross-section (preferably circular) into a conduit of larger cross-section (preferably circular) by providing a transition zone flaring from the smaller conduit into the larger conduit, and providing at and/or proximate to (but preferably at and partly downstream of) the transition zone flushing flow flaring means.

Preferably said flaring means is supported from an upstream appendage preferably having little flow interference (eg: a blade or thin plate affixed to opposed walls of the smaller conduit and/or the expansion "cone").

In another aspect the invention consists in the retro-fitting of a milking machine (eg; using apparatus of the present invention) to provide a milking machine of the present invention.

As used herein the term "vacuum" is used in the normal sense utilised in the milking industry, i.e. it involves at least some reduction in pressure(s) below that or those of either the gas or fluid activating the pulsators/inflations of the clusters and/or is below ambient air pressure.

As used herein "cleaning line" preferably refers to a conduit or tube of any cross section. Preferably it is of a constant cross section but not necessarily so. In order to reduce flow restrictions, reservoirs or other expansions of the cross section of the cleaning line for the pooling and/or flow of the cleaning fluid is ideally to be avoided. However since this is not necessarily so, the term "cleaning line" should be interpreted in the broadest possible sense.

A preferred form of the present invention will now be described with reference to the accompanying drawings in which FIG. 1 shows a milking machine in accordance with the present invention in a diagrammatic form when being operated in its cleaning mode, FIG. 2 shows in dotted outline on the left a conduit of smaller cross section feeding into a conduit of larger cross section via an expansion zone, such conduits preferably being circular with that on the left being the cleaning line and that of larger cross section being the milk line, FIG. 2 showing in solid outline connected to the walls of the cleaning line a blade like member which carries a frustoconical or substantially frustoconical member which in its position partly within the expansion zone and partly downstream thereof will have the flaring effect on the flow stream as depicted by the arrows, FIG. 3 shows a proprietary item as it might be manufactured, ie: a transition zone assembly for welding at each end into the milk line and cleaning lines, FIG. 4 is a view BB of the flaring means alone, FIG. 5 is a view of the arrangement of FIG. 3 in the direction AA, FIG. 6 is a view of the assembly of FIG. 3 from the other end, FIG. 7 is a perspective view of a variant of the flaring means of FIG. 4 showing the flow deployment thereof, it being optional whether or not the flaring means includes a cone or frustoconical or some equivalent flaring structure which is either solid in form or provided with any passageway or passageways therethrough.

As can be seen there is a milk line 1 which preferably is large line (e.g. a 101 mm (4 inch) diameter milking machine milk line (and preferably a loop line)) that feeds to a milk receiver 2 which preferably is cylindrical in cross section as shown in FIG. 1 and which preferably receives each end of the loop of the milk line 1.

Preferably a fall in the milk line occurs such that milk is assisted by gravity into the milk receiver 2. Likewise the cleaning fluid which in the preferred form of the present invention is water alone or water with appropriate cleaning agents has a rise against which the cleaning fluid must be urged.

In conjunction with the milk line 1 is a jetter line 3 having jetters spaced there along each to correspond to each milking station. This is shown diagrammatically by the ellipse 4. In each case it is a milk claw of each milking station attached to jetters of the jetter line 3 as preferably required in the cleaning mode.

In the cleaning mode therefore, as is conventional, under the action of the vacuum source (not shown) applied via the vacuum line 5 to the sanitary trap 6 of the vacuum line to the milk receiver 2, a flow of cleaning liquid from a source of cleaning fluid, (e.g. reservoir 7) occurs as depicted, (i.e. the cleaning fluid enters the clusters and then passes as arrowed therefrom into the milk line 1 along the usual milk conduit from each claw into the milk line 1).

In the cleaning mode cleaning fluid 2 (e.g. water with or without cleaning agents) can either be dumped directly out of one or both of the milk receiver 2 and the sanitary gap 6 or alternatively be dumped (as at 8) downstream of the milk pump 9. This can, if desired, be after the loss of the vacuum source.

The present invention has a cleaning line 11 with an air injection, induction or ingress point 12 such that cleaning fluid (whether sourced by drawing from the reservoir 7 or not) can travel along the cleaning line 11 and from thence via an expansion region 13 into the milk line 1.

Preferably a choking means restricting means or other flow impeding means 14 (shown diagrammatically only in FIG. 1) is provided so as to restrict the uptake of fluid from reservoir 7 under the milk line vacuum into the cleaning line 11 yet, nevertheless, preferably maintain an appropriate trickle flow (at the very least) from the cleaning line 11, via the expansion zone 13, into the milk line 1 between slug wash type flows being induced from the pooling cleaning fluid of the cleaning line 11 under the gas input, intake, etc.

To this end, preferably between the gas or air intake at zone 12, there is a rise in liquid level so as to accumulate a pool of the cleaning liquid over a period of time between the slug flows. Preferably a one and a half degree rise (preferably consistent with the fall of the milk line) is sufficient for this purpose.

Preferably the air intake is from ambient air under the control of timers adapted to time valve controller impulses to enable sufficient pooling such that air enters directly into the cleaning fluid to thus cause the turbulent slug flow through the expansion zone 13, the milk line 1, about the receiver 2 and preferably at least in part into and about the sanitary trap 6.

Not shown are preferably release taps and/or valves for washing fluid in the milk take off system from the milk receiver 2 or the vacuum line system and/or sanitary trap 6.

Preferably the sanitary trap 6 is circular in cross section although shown in FIG. 2 with its axis of rotation substantially normal to that of the milk receiver.

Preferably the system is such that any liquid accumulating in the sanitary trap 6 is released before it has the prospect of being drawn up into the vacuum line 5 in any substantial quantity.

The expansion region 13 is preferably an expansion cone going from 50 mm to 101 mm diameter.

FIGS. 2 to 6 show a preferred form of a component of the milking machine capable by welding of its preferred stainless steel components into the milking machine of providing the features depicted in FIG. 2.

As can be seen the transition zone 13 provided by the construction of FIG. 3 provides for a flaring means 14, namely a substantially conical or frustoconical form (hollow, passaged or solid) of providing the flaring effect on the flow depicted in FIG. 2, the flaring member 14 being supported by a blade 15 which is preferably tack welded at 16 to the walls of the cylindrical region 17 to be connected (preferably by welding or other means) to the cleaning line 11.

For the diameters referred to herein of a preferred milking machine preferably the frustoconical part of the flaring means has a length of about 40 mm and expands as a frustoconical form from a diameter of about 25 mm to a diameter of about 50 mm. Preferably the length of the blade or plate support therefore 15 is about 125 mm long and is tack welded within that region 17 of the structure of FIG. 3 which has a length of about 50 mm.

All of the structure of FIG. 3 is preferably of stainless steel.

As can be seen the support of the flaring member 14 by a member 15 having little effect on the flow and which, of itself, prevents little in the way of a cleaning difficulty is an enhancement of the flaring zone effect at 13 in a milking machine as described with reference to FIG. 1. This is irrespective of whether or not we are dealing with an ended milk line 1 or a looped milk line into which (at a region most remote from the receiver 2) there is the provision of the transition zone from the cleaning line 11.

In use therefore the present invention provides an alternative to existing systems. The system can eliminate the 3 way trap and suction valves of most systems, remove the complexity of operation and to allow a 101 mm (4") milking machine to operate in a standard wash configuration using the jetters to wash the cluster sets and a slugger-line to wash the milk-line and to create turbulence throughout the system.

The main difference of this system is that the 101 mm milk-line need not have valves on the milk-line, the trap/ receiver airline, or the receiver trap suction line to the milk-pump. The system preferably only requires valves for the intakes from 7 only.

The system operates using the slugger-line in support of the main jetter wash-line.

The system preferably incorporates the use of a stainless steel disc with a predetermined hole which is inserted between the preferred first nylon union in the slugger line to control the flow of wash water into the slugger-line. The slugger line falls at the same rate and direction as the milk line thus building a reserve of wash water similar to a weir system. The fall allows the pipe to partially fill with wash water during this process which is then periodically or from time to time blasted into the milk line using preferably an electronic air injector or valve.

The disc (hole sizes) are changed until the optimum flow rate is achieved.

The system may be used in the wash configuration using either standard or NRV (non return valve) jetters.

The system does away with all but the reservoir valve or valves and has no requirement for spray heads in the milk receiver.

A 50 mm to 101 mm expansion cone at the end of the milk-line the system creates in the wash mode a fan effect and spreads the wash water out and around the milk-pipe creating a slug that can be maintained through the entire length of the milk-pipe.

In the milk mode of course with the valve or valves to the reservoir 7 closed for preferably both lines 3 and 11 the milk claw clusters are used in the conventional sense and milk is drawn directly into the milk line (there being no flow through of liquid from the cleaning line 11).

Preferably between uses the milking apparatus is such that all cleaning fluid may be drained from the lines 3 and 11, e.g. as may occur after the removal of vacuum owing to the fall back into the reservoir for cleaning fluid 7.

It is believed that the present invention provides a viable option long awaited for large cross-sectioned milk lined milking machines.

What I claim is:

1. A milking machine having a milk line to a milk receiver through which a vacuum is drawn, said machine being operable in (i) a milking mode and in (ii) a cleaning mode, said milking machine comprising:

a cleaning line for cleaning fluid to be introduced into said milk line through an expansion region, and, when the machine is in said cleaning mode, cleaning fluid in said cleaning line is caused to move under the action of a gas impulse into the cleaning fluid and from said cleaning line into said milk line through said expansion region, and the gas impulse being one of a series of impulses into different quantities of cleaning fluid.

2. A milking machine of claim 1 wherein said cleaning fluid moves into said milk receiver.

3. A milking machine of claim 2 wherein said cleaning fluid moves from said milk receiver into a sanitary trap at least in part above said milk receiver.

4. A milking machine of claim 1 wherein said gas is air.

5. A milking machine of claim 4 wherein said air is ambient air.

6. A milking machine of claim 1 wherein said impulses are periodic.

7. A milking machine of claim 1 wherein said milking machine has a jetter line having jetters to which milking cups of a milk claw can be attached when configured to the cleaning mode so as to utilise the vacuum in the milk line to draw a cleaning fluid in from the jetter line.

8. A milking machine of claim 7 wherein said cleaning line is adapted to draw cleaning liquid from a same source as said jetter line only during the cleaning mode.

9. A milking machine of claim 1 wherein said milk line has a fall from where it is to receive cleaning fluid from said cleaning line through to said milk receiver.

10. A milking machine of claim 1 wherein said milk line is a loop line.

11. A milking machine of claim 1 wherein the impulse flow of the cleaning fluid during the cleaning mode is such as to cause flows at different times along the milk line, into the milk and into a sanitary trap.

12. A milking machine of claim 11 wherein said milk receiver is connected to a milk pump and said sanitary trap is connected to a source of vacuum.

13. A milking machine of claim 12 wherein said cleaning liquid can be discharged from one of the milk receiver and said milk pump.

14. A milking machine of claim 12 wherein cleaning liquid accumulating in the sanitary trap can be drained therefrom as and when required.

15. A milking machine of claim 1 wherein said milk line is of a diameter larger than a diameter of said cleaning line and connected by said expansion region.

16. A milking machine of claim 1 wherein said expansion region involves a substantially frustoconical surface.

17. A milking machine of claim 1 wherein a flushing flow flaring device is located in said expansion region.

18. A milking machine of claim 17 wherein said flaring device is at and partly downstream of the expansion region.

19. A milking machine of claim 17 wherein said flaring device is substantially conical or frustoconical.

20. A milking machine of claim 17 wherein said flaring device is substantially conical or frustoconical.

21. A milking machine of claim 1 wherein gas injection to provide the gas impulse is provided by a valve having associated therewith control systems which are one of timer and sensor based.

22. Apparatus for operative association with components of a milking machine including a milk line to a milk receiver through which a vacuum is drawn, said machine being operable in (i) a milking mode and in (ii) a cleaning mode, said milking machine comprising:
    a cleaning line for cleaning fluid to be introduced into said milk line,
    and, when the machine is in said cleaning mode, cleaning fluid in said cleaning line is caused to move under the action of a gas impulse into the cleaning fluid and from said cleaning line into said milk line, said apparatus comprising
        a conduit having an intake end for liquid and an outlet end connected into the milk line of the milking machine by an expansion region,
        an air intake to allow the intake of air into said conduit between said ends, and
        a partial flow restrictor for liquid between said intake end and the air intake.

23. Apparatus of claim 22 mountable so as to pool intake liquid into contact with part of said air intake.

24. Apparatus of claim 22 wherein said outlet end includes said expansion region.

25. Apparatus of claim 24 wherein said outlet end has a cross-section several times that of a cross-section of said conduit and many times a cross-section of the flow restrictor.

26. Apparatus of claim 22 wherein said outlet end provides for passage of the flushing liquid from a conduit of smaller cross-section into a conduit of larger cross-section by said expansion region flaring from the smaller cross-section conduit into the larger cross-section conduit, and
    the expansion region including a flushing flow flaring device.

27. A milking machine having a milk line to a milk receiver through which a vacuum is drawn, said machine being operable in (i) a milking mode and in (ii) a cleaning mode, said milking machine comprising:
    a cleaning line for cleaning fluid to be introduced into said milk line through an expansion region,
    and, when the machine is in said cleaning mode, cleaning fluid in said cleaning line is caused to move under the action of a gas impulse into the cleaning fluid from said cleaning line into said milk line through said expansion region, and said gas impulse into the cleaning fluid is caused solely by an induction of ambient air at ambient pressure under the action of said vacuum in the milk line.

28. A milking machine having a milk line to a milk receiver through which a vacuum is drawn, said machine being operable in (i) a milking mode and in (ii) a cleaning mode, said milking machine comprising:
    a cleaning line for cleaning fluid to be introduced into said milk line through an expansion region,
    and, when the machine is in said cleaning mode, cleaning fluid in said cleaning line is caused to move under the action of a gas impulse into the cleaning fluid and from said cleaning line into said milk line through an expansion region, and
    said cleaning line having at least a rising region spaced from a gas impulse injection region, so as to achieve at least one of pooling and flooding to ensure a sufficient quantity of the cleaning liquid being positioned between the incoming gas and the milk line.

29. A milking machine having a milk line to a milk receiver through which a vacuum is drawn, said machine being operable in (i) a milking mode and in (ii) a cleaning mode, said milking machine comprising:
    a cleaning line for cleaning fluid to be introduced into said milk line through an expansion region,
    and, when the machine is in said cleaning mode, cleaning fluid in said cleaning line is caused to move under the action of a gas impulse into the cleaning fluid and from said cleaning line into said milk line through said expansion region, and
    a flow restrictor being positioned between a region where the impulse gas is injected and a source of the cleaning liquid for the cleaning line such that even in the absence of any gas injection there is in the cleaning mode a flow of said cleaning liquid into at least the cleaning line.

30. A milking machine of claim 29 wherein said flow restrictor is a restrictor plate.

31. A milking machine of claim 29 wherein said cleaning line is valved.

32. A milking machine operable in a milking mode and a cleaning mode, said milking machine comprising:
    a milk receiver,
    a milk line to said milk receiver,
    means to draw a below atmospheric pressure in said milk receiver and said milk line,
    a cleaning line having an inlet for a cleaning liquid in said cleaning mode and an outlet via a transition zone which opens into a larger cross-section of said milk line, said cleaning line being capable of pooling liquid that has entered via said inlet at a pooling zone prior to the liquid via the transition zone entering into said milk line, and
    a valve for allowing an air intake into said cleaning line between said inlet and said pooling zone under the action of the below atmospheric pressure of said milk line, and in said cleaning mode, the air intake under the action of the milk line being below atmospheric pressure causes previously pooled liquid to run from said cleaning line via said transition zone as a slug of cleaning fluid into and along said milk line and from thence into at least said milk receiver.

33. The milking machine of claim 32, wherein said transition zone opens into said milk line as a flared substantially frusto-conical surface.

34. The milking machine of claim 32, wherein said transition zone includes cleaning liquid flaring means to improve the deployment of the cleaning liquid from the cleaning line of smaller cross-section into the milk line of a larger cross-section.

35. The milking machine of claim 34, wherein said cleaning liquid flaring means is at and partly downstream with respect to the cleaning liquid flow of the transition zone.

36. The milking machine of claim 34, wherein said cleaning liquid flaring means is substantially disposed to be substantially at a center of said cleaning liquid flow.

37. A milking machine of claim 34, wherein said cleaning liquid flaring means is supported from an upstream position from a wall of at least one of said cleaning line and said transition zone.

38. The milking machine of claim 32, wherein there is a sanitary trap above said milk receiver through which the below atmospheric pressure is drawn by a vacuum pump and said intake air moved cleaning fluid moves from said milk receiver via said milk receiver into said sanitary trap.

39. The milking machine of claim 32, wherein in the cleaning mode, said valve operates to allow a series of air intakes, each to force a slug of cleaning liquid through said milk line.

40. The milking machine of claim 32, wherein said milking machine has a jetter line having jetters to which milking cups of a milk claw are attached when configured in the cleaning mode so as to utilize the vacuum in the milk line to draw a cleaning fluid in from the jetter line into the milk line.

41. The milking machine of claim 40, wherein said cleaning line draws said cleaning liquid from a same source as said jetter line.

42. The milking machine of claim 32, wherein said cleaning line has at least a rising region from a region at which intake air enters under control of said valve into said cleaning line so as to achieve at least one of pooling and flooding to ensure a sufficient quantity of the cleaning liquid for a slug flow along the milk line.

43. The milking machine of claim 32, wherein in the cleaning line, flow restricting means is positioned between the region where the intake air is allowed by the valve to enter and a source of the cleaning liquid for the cleaning line such that, in the cleaning mode, a net is drawn in flow of cleaning liquid into at least the cleaning line.

44. The milking machine of claim 43, wherein said flow restricting means is a restrictor plate.

45. The milking machine of claim 43, wherein said cleaning line also includes a valve.

46. The milking machine of claim 32, wherein said milk line has a fall from said transition zone to said milk receiver.

47. The milking machine of claim 32, wherein said milk line is a loop line and said transition zone is spaced as far as possible, via the milk line, away from said milk receiver.

48. The milking machine of claim 47, wherein said milk receiver is connected to a milk pump and a sanitary trap is connected to a vacuum pump.

49. The milking machine of claim 48, wherein means is provided whereby said cleaning liquid is discharged downstream of the milk receiver at at least one outlet.

50. The milking machine of claim 49, wherein means is provided whereby any cleaning liquid accumulating in the sanitary trap is drained therefrom as and when required.

* * * * *